United States Patent
Nam

Patent Number: 5,349,029
Date of Patent: Sep. 20, 1994

[54] EPOXY RESIN COMPOSITIONS WITH IMPROVED HEAT RESISTANCE

[75] Inventor: Tai Y. Nam, Suwon, Rep. of Korea

[73] Assignee: Cheil Industries, Inc., Rep. of Korea

[21] Appl. No.: 911,762

[22] Filed: Jul. 10, 1992

[30] Foreign Application Priority Data

Jul. 11, 1991 [KR] Rep. of Korea ............... 91-11808

[51] Int. Cl.$^5$ ............................................. C08G 59/02
[52] U.S. Cl. ................................. 525/476; 525/502; 523/429; 523/433; 523/435
[58] Field of Search ................ 525/422, 476, 502; 523/429, 434, 433, 435

[56] References Cited

U.S. PATENT DOCUMENTS

| | | | |
|---|---|---|---|
| 4,288,359 | 9/1981 | Graham | 525/527 |
| 4,632,966 | 12/1986 | Kanagawa et al. | 525/502 |
| 4,871,832 | 10/1989 | Saito et al. | 528/353 |
| 4,985,529 | 1/1991 | Saito et al. | 528/96 |
| 5,041,474 | 8/1991 | Kim et al. | 523/435 |

FOREIGN PATENT DOCUMENTS

| | | |
|---|---|---|
| 48-67395 | 9/1973 | Japan . |
| 54-142298 | 11/1979 | Japan . |
| 58-89619 | 5/1983 | Japan . |
| 58-215452 | 12/1983 | Japan . |
| 59-64660 | 4/1984 | Japan . |
| 59-227924 | 12/1984 | Japan . |
| 62-53324 | 3/1987 | Japan . |
| 62-195015 | 8/1987 | Japan . |
| 62-212419 | 9/1987 | Japan . |
| 62-227917 | 10/1987 | Japan . |
| 62-270618 | 11/1987 | Japan . |
| 63-35626 | 2/1988 | Japan . |
| 63-37118 | 2/1988 | Japan . |
| 63-031619 | 6/1988 | Japan . |

OTHER PUBLICATIONS

"Biaspartimide-diamines as Curing Agents for Epoxy Resins" by Devendra Kumar and Alka D. Gupta, from *J. Macromol. Sci.-Chem.*, A22 (8), pp. 1101–1107, copyright 1985.

"DSC Evaluation of Epoxy and Polyimide-Impregnated Laminates (Prepregs)" by L. T. Pappalardo, from *Journal of Applied Polymer Science*, vol. 21, pp. 809–820, copyright 1977.

*Primary Examiner*—Ralph H. Dean
*Attorney, Agent, or Firm*—Merchant, Gould, Smith, Edell, Welter & Schmidt

[57] ABSTRACT

Epoxy resin compositions for sealing semiconductor elements are disclosed and include an epoxy resin, a maleimide-modified siloxane compound represented by the formula (1) and an allylphenol-novolac resin represented by the formula (2) as a curing agent, and demonstrate low stress, high heat resistance and moldability.

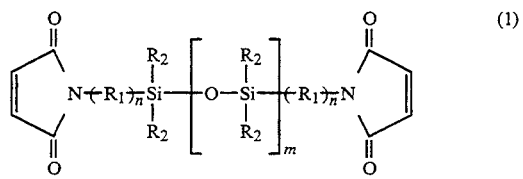

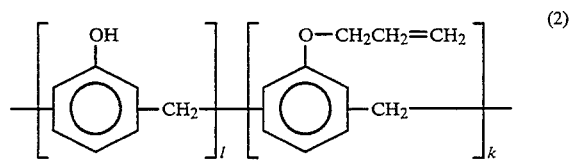

wherein, $R_1$ denotes a methylene group a phenylene group or a substituted phenylene group, $R_2$ denotes a methyl group, a phenyl group or a substituted phenyl group, n denotes 1 when $R_1$ denotes phenylene or substituted phenylene groups, or 3 or 4 when $R_1$ denotes a methylene group, m denotes an integer of from 1 to 100, l denotes an integer of from 1 to 100, and κ denotes an integer of from 1 to 100.

2 Claims, No Drawings

EPOXY RESIN COMPOSITIONS WITH IMPROVED HEAT RESISTANCE

FIELD OF THE INVENTION

The present invention relates to epoxy resin compositions comprising a new siloxane-based modifier. More particularly, the present invention relates to epoxy resin compositions comprising a siloxane-based modifier into which maleimide groups are incorporated to improve low stress, heat resistance and moldability. The epoxy resin compositions of the present invention are useful for sealing semiconductor elements.

BACKGROUND OF THE INVENTION

Cured products comprising epoxy resins and additional adhesives are widely used in many industrial fields, since they exhibit excellent thermal, mechanical, electric and adhesive properties. In particular, blended molding materials of epoxy resins and fillers are widely used as adhesives, insulating materials or structural materials for electronic or electric equipment, and played a part in making the equipment compact, improving reliability and increasing productivity.

During the past few years, due to the high performance, compact and light weight of products in the electronic and transportation fields, such as aircraft and automobiles, materials having high heat and stress resistance are required.

In addition, protecting semiconductor elements from moisture and impact has undergone enormous advancement. The packaging mode is generally classified into two types, one using ceramics or metals and the other using epoxy resins or silicone resins. However, plastic resin packaging using epoxy resins is the main type, in view of the associated productivity and cost.

Recently, due to the high integration of semiconductors, while the size of a chip has become larger, the width of the component wires has become narrower. Accordingly, increased stress resistance properties to improve reflow and to decrease thermal stress generated during the use of the article are required.

Specifically, according to surface mounting technology, unlike the constitutional Dual In Line Package (DIP), the package should withstand soldering conducted at temperatures above 215° C., which requires highly heat resistance materials.

In view of such requirements, although the conventional epoxy resins have good mechanical and electric properties and advantages in productivity and cost, the heat resistant properties of the prior art epoxy resins are poor.

In order to solve such problems, the use of a polyimide having high heat resistance has been proposed, instead of using epoxy resins. However, polyimides have poor moldability, due to its non-dissolving and non-melting properties. Also, it is costly. In addition, bismaleimides represented by N,N'-4,4'-diphenylmethane bismaleimide having high heat stability require high temperature and long curing time.

Japanese Laid-open Patent Publication Nos.(Sho)54-142298, 62-53324, 62-270618, etc. disclose that epoxy resins are cured with reaction initiators having functional groups such as —COOH, —OH, —NH$_2$, and the like, at the imide backbone terminal to increase the thermal properties of the resin compositions.

Japanese Laid-open Patent Publication Nos.(Sho)58-215452, 58-89619, 59-64660, 59-227924 and 62-227917 disclose that compounds having amino groups at the terminal such as p- or m-aminophenol or diaminodiphenylmethane are reacted with conventional maleimides to obtain a prepolymer, and the resulting prepolymer is added to the resin compositions to react the remaining amino groups with the epoxy groups of the resin compositions, whereby the heat resistance of the resin composition is improved. However, the said prior art has limitations in controlling the reaction level and increasing the contents of imide groups. In addition, stress resistance of the resin compositions obtained from the prior art is decreased, since the stress is increased by the addition of maleimides, which are thermal properties modifiers.

Japanese Laid-open Patent Publication Nos.(Sho) 63-35626, etc. disclose a method for preparing thermal and mechanical properties modifiers by reacting siloxane diamines with acid anhydride, such as pyromelitic anhydride for biphenyltetracarboxylic dianhydride, or by reacting siloxanes having a terminal anhydride with diamine-based curing agents in the simple form. However, they are costly and difficult to handle in preparing a resin silant.

In order to solve the above-mentioned problems, we have extensively studied the relevant technology. As a result, we noted that the use of curing agents capable of simultaneously reacting with epoxy groups of epoxy resins and maleimide groups of maleimide-modified siloxane modifiers provides epoxy resin compositions having excellent heat resistance, stress resistance, processability and applicability.

SUMMARY OF THE INVENTION

The purpose of the present invention is to provide epoxy resin compositions having improved heat resistance.

According to the present invention, the epoxy resin compositions comprising epoxy resins, curing agents, modifiers, curing promotors and coupling agents and being useful for sealing semiconductor elements are characterized in that a novel maleimide-modified siloxane compound represented by the formula (1) is used as a modifier and an allylphenol-novolac resin represented by the formula (2) is used as a curing agent.

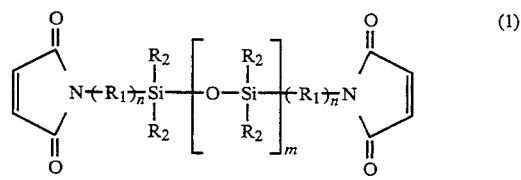

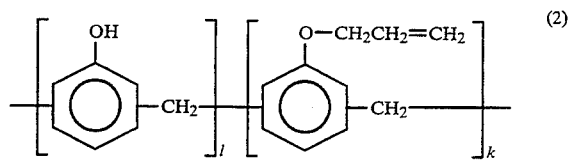

wherein,
- $R_1$ denotes a methylene group, a phenylene group or a substituted phenylene group,
- $R_2$ denotes a methyl group, a phenyl group or a substituted phenyl group,
- n denotes 1 when $R_1$ denotes phenylene or substituted phenylene groups, or 3 or 4 when $R_1$ denotes a methylene group, m denotes an integer of from 1 to 100,
l denotes an integer of from 1 to 100, and
κ denotes an integer of from 1 to 100.

Preferable constitutional ratios of the present epoxy resin composition are as follows:

| | |
|---|---|
| Epoxy resin | 0.1–15 wt % |
| Maleimide-modified siloxane (modifier) | 1.0–15 wt % |
| Allylphenol-novolac resin (curing agent) | 4–10 wt % |
| Curing promotor | 0.1–0.8 wt % |
| Coupling agent | 0.1–2.0 wt % |
| Colorant | 0.1–0.5 wt % |
| Filler | 70–85 wt % |
| Mold release agent | 0.1–1.0 wt % |
| Flame retardant | 0.5–3.0 wt % |

It is the most preferable to constitute the epoxy resin compositions of the present invention with the above components and amounts. In addition, it is also preferable to add about 1 to 5 wt% of maleimides to the composition so as to replenish the thermal properties.

Epoxy resins to be used in the present invention include o-cresol-novolac type resins having excellent heat resistance, specifically those having 190 to 220 of epoxy equivalents and high purity, that is, below 10 ppm of impurities.

Maleimide-modified siloxane compounds of formula (1) used in the present invention as a modifier can be prepared via the following reaction routes.

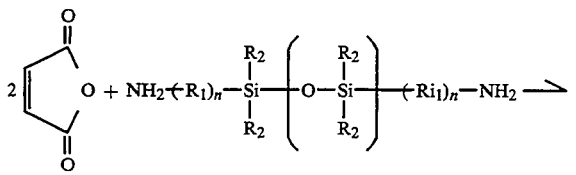

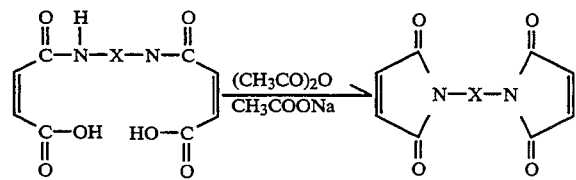

wherein
X represents a group of

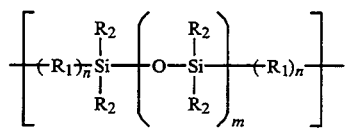

$R_1$ denotes a methylene group, a phenylene group or a substituted phenylene group, $R_2$ denotes a methyl group, a phenyl group or a substituted phenyl group, n represents 1 when $R_1$ is a phenylene group or a substituted phenylene groups, or 3 or 4 when $R_1$ is a methylene group, and m represents an integer of from 1 to 100, Diaminosiloxane was reacted with N-methyl-2-pyrolidone under $N_2$ atmosphere at below 15° C. for 3 to 10 hrs., with the addition of equivalent weights of maleic anhydride. The resulting maleiamic acid was stirred with acetic anhydride and sodium acetate at 40° to 50° C. for several hours, cyclized with dehydration, treated with ice water, and dried to obtain viscous, brown, maleimide-modified siloxane modifier.

Partially allyl-etherified phenol-novolac resin is used in the present invention as a curing agent, since it simultaneously acts as a curing agent for epoxy resins and reactant with maleimide-modified siloxane modifier.

Allylphenol-novolac resin is synthesized via following reaction scheme as follows: o-cresol-novolac resin having about 100° C. of softening point is completely dissolved, allyl bromide is added thereto, and the resultant mixture is thoroughly stirred. NaOH aqueous solution is added to the mixture at 60° C. for 2 hrs., and reacted for about 8 hrs. Aqueous layer is decanted, unreacted allyl bromide and acetone are removed, foluene is added to dissolve the resins. The resultant mixture is purified by washing and filtering off to yield partially substituted allylphenol-novolac resin.

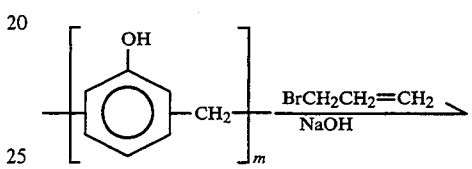

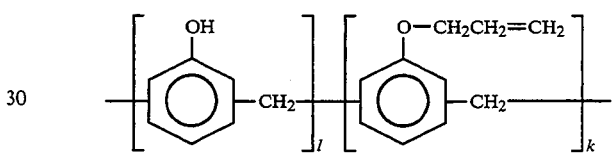

(wherein, l and m represent an integer of 1 to 100, and κ represents an integer of 1 to 100.)

Fillers to be used in the present invention include fused silica,. The silica having an average particle size of 10 to 30 μm is preferable to use in the present invention.

Curing promotors to be used in the present invention include organophosphine compounds such as triphenylphosphine and imidazole derivatives such as 2-methylimidazole and 2-methyl-4-ethylimidazole.

Coupling agents to be used for surface treating inorganic fillers in the present invention include silane-based coupling agents, especially γ-grycidoxypropyl trimethoxy silane.

Mold release agents include carnauba wax and Montan wax, which are used in the present invention in an amount of from 0.1% by weight to 1.0% by weight.

Colorants include carbon black. The amounts to be used is from 0.1% by weight to 0.5% by weight.

Flame retardants include brominated epoxy resin and $Sb_2O_3$.

The epoxy resin compositions of the present invention can be prepared by treating inorganic fillers with coupling agents, homogeneously mixing them with the remaining components in Rodige mixer, melt mixing the mixture at 90° to 120° C. in a kneader, and cold pulverizing it to obtain powder. The powdery compositions are tableted in a tableting machine, and the tableted compositions are molded in a transfer molder at 170° to 180° C. for 90 to 120 sec. to seal the semiconductor elements.

Hereinafter, the present invention will be explained in detail by means of examples, which should not be construed to limit the scope of the present invention.

EXAMPLES 1-5

Constitutional components having the composition listed in Table 1 are mixed in a Rodige mixer to give a homogeneous primary composition in the form of powder. The primary composition was kneaded in a kneader at a temperature of 100° C. for 10min., subjected to cold process, and pulverized to obtain epoxy resin compositions for molding materials.

Physical properties of the molding materials obtained from the above epoxy resin composition were evaluated as follows. The results were listed in Table 2.

1) Spiral flow: Measured at 175° C. of molding temperature and 70kgf/cm² of molding pressure using a mold prepared according to EMMI standard.
2) Tg: Measured with TMA equipment.
3) E (kgf/mm²): Measured with UTM according to ASTM D 190.
4) Flexural strength: Measured with UTM according to ASTM D 190.
5) Thermal expansion coefficient $\alpha$ (° $C^{-1}$): Measured according to ASTM D 696.
6) Heat resistance test by VPS: Standing in a vapor phase soldering bath at 125° C. for 1 min., and then observing the cracking.
7) Degree of the mold soiling: Measured the maximum possible molding number, without the molding cleaner.

COMPARATIVE EXAMPLES 1-3

Comparative Examples 1-3 were carried out in a manner similar to Examples 1-5 using the constitutional composition set forth in Table 1, and the physical properties were also measured in the same manner as Examples 1-5. The results are listed in Table 3.

TABLE 1

| Components (weight %) | Example Nos. | | | | | Comparative Example Nos. | | |
|---|---|---|---|---|---|---|---|---|
| | 1 | 2 | 3 | 4 | 5 | 1 | 2 | 3 |
| o-Cresol-novolac epoxy resins | 14.57 | 14.57 | 14.57 | 14.57 | 14.57 | 14.57 | 14.57 | 14.57 |
| Allyl-modified phenol-novolac resins | 5.83 | 5.83 | 5.83 | 5.83 | 5.83 | — | — | — |
| Phenol-novolac resins | — | — | — | — | — | 5.83 | 5.83 | 5.83 |
| Triphenyl-phosphine | 0.38 | 0.38 | 0.38 | 0.38 | 0.38 | 0.38 | 0.38 | 0.38 |
| Fused silica | 73.8 | 73.8 | 73.8 | 73.8 | 73.8 | 73.8 | 73.8 | 73.8 |
| Maleimide-modified siloxane (modifier) | 1.0 | 1.1 | 1.2 | 1.0 | 1.2 | — | — | — |
| Epoxy-terminated siloxane (modifier) | — | — | — | — | — | 1.1 | 1.0 | 1.2 |
| Coupling agent (KBM 403) | 1.11 | 1.11 | 1.11 | 1.11 | 1.11 | 1.11 | 1.11 | 1.11 |
| Carnauba wax | 0.23 | 0.23 | 0.23 | 0.23 | 0.23 | 0.23 | 0.23 | 0.23 |
| $Sb_2O_3$ | 0.85 | 0.85 | 0.85 | 0.85 | 0.85 | 0.85 | 0.85 | 0.85 |
| Carbon Black | 0.26 | 0.26 | 0.26 | 0.26 | 0.26 | 0.26 | 0.26 | 0.26 |
| Maleimide (MB3000)* | — | — | — | 2 | — | — | 2 | — |
| Maleimide (MB2000)* | — | — | — | — | 2 | — | — | 2 |

(*Maleimide: Manufacture by Mitsubish Petrochemical Co., Ltd., Japan)

TABLE 2

| Contents | Example Nos. | | | | | Comparative Example Nos. | | |
|---|---|---|---|---|---|---|---|---|
| | 1 | 2 | 3 | 4 | 5 | 1 | 2 | 3 |
| Spiral flow | 45 | 43 | 43 | 45 | 43 | 43 | 40 | 38 |
| Tg (°C.) | 185 | 190 | 202 | 200 | 210 | 175 | 180 | 185 |
| E (kgf/mm²) | 1300 | 1150 | 1100 | 1300 | 1200 | 1200 | 1300 | 1200 |
| F (kgf/mm²) | 13.0 | 13.0 | 14.0 | 13.0 | 15.0 | 13.0 | 13.0 | 13.0 |
| $\alpha$ (× $10^{-5}$/°C.) | 1.8 | 1.7 | 1.6 | 1.8 | 1.6 | 1.7 | 1.8 | 1.8 |
| Heat resistance test by VPS* | 2/600 | 0/600 | 0/600 | 0/600 | 0/600 | 5/600 | 10/600 | 10/600 |
| Degree of mold soiling** | 500 | 600 | 600 | 600 | 600 | 200 | 100 | 50 |

*In the values showing the heat resistance test by VPS, denominator represents the number of samples and numerator represents the failure numbers.
**Maximum number capable of molding without mold cleaner.

I claim:

1. An epoxy resin composition for sealing a semi-conductor element, comprising:
an o-cresol-novolac epoxy resin, a curing agent, a modifier, an organophosphine-based curing promotor, an inorganic filler, wherein the modifier comprises a maleimide-modified siloxane-based compound of the formula (1), and the curing agent comprises an allyl-etherified phenol-novolac resin of the formula (2), as follows:

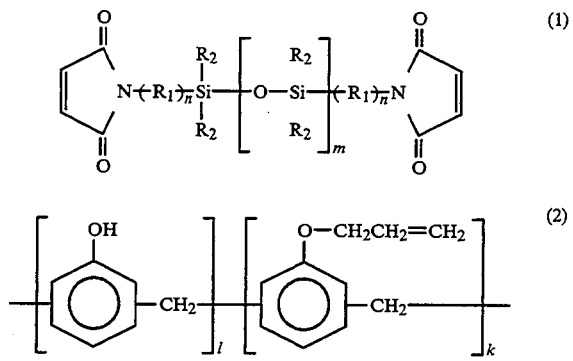

wherein
- $R_1$ denotes a methylene group, a phenylene group or a substituted phenylene group,
- $R_2$ denotes a methyl group, a phenyl group or a substituted phenyl group,
- n denoted 1 when $R_1$ is a phenylene or a substituted phenylene group, or 3 or 4 when $R_1$ is a methylene group,
- m denotes an integer of from 1 to 100,
- l denotes an integer of from 1 to 100, and
- κ denotes an integer of from 1 to 100.

2. The epoxy resin composition for sealing semiconductor elements of claim 1, wherein the composition includes the maleimide modified siloxane based compound in an amount of from 1.0% by weight to 15% by weight and the allyl-etherified phenol novolac resin in an amount of from 4% by weight to 10% by weight, the weight-% being based on the total weight of the composition.

* * * * *